April 18, 1939.   J. J. JAKOSKY   2,155,133
ELECTRICAL METHOD AND APPARATUS FOR DETERMINING THE
CHARACTERISTICS OF GEOLOGIC FORMATIONS
Filed Oct. 28, 1936
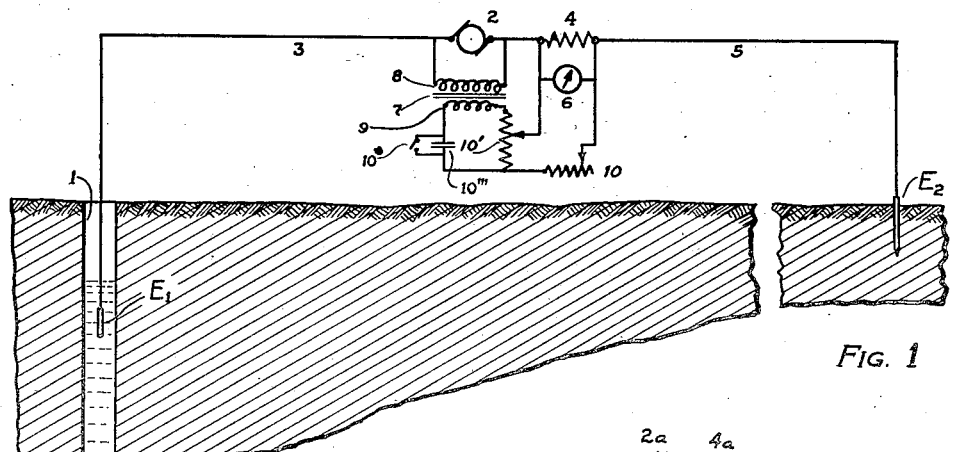
FIG. 1
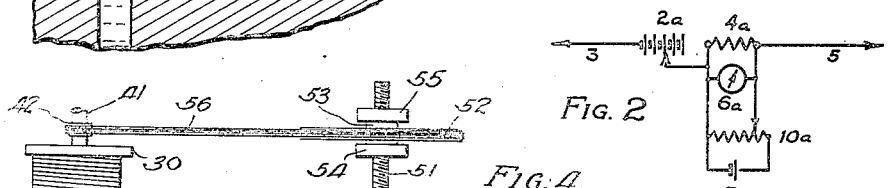
FIG. 2
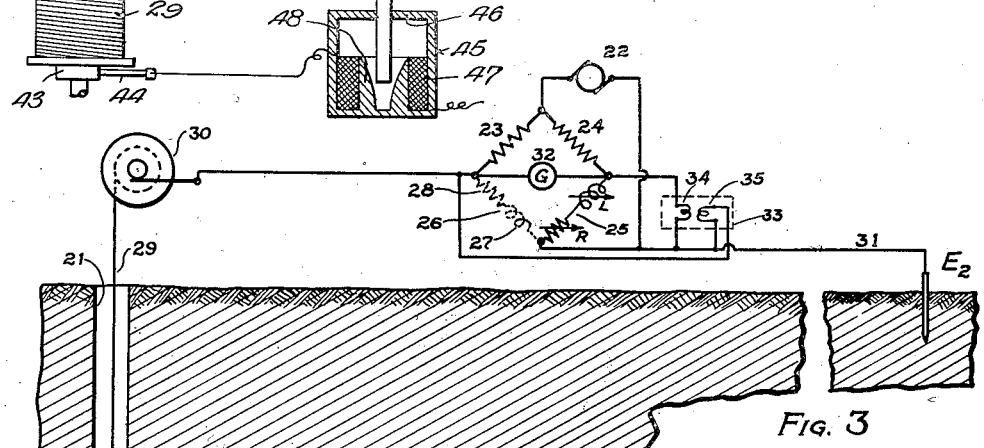
FIG. 3
FIG. 4
John Jay Jakosky
INVENTOR.
BY
ATTORNEYS.

Patented Apr. 18, 1939

2,155,133

UNITED STATES PATENT OFFICE 2,155,133

ELECTRICAL METHOD AND APPARATUS FOR DETERMINING THE CHARACTERISTICS OF GEOLOGIC FORMATIONS

John Jay Jakosky, Los Angeles, Calif., assignor to Schlumberger Well Surveying Corporation, Houston, Tex., a corporation of Delaware Application October 28, 1936, Serial No. 108,022

14 Claims. (Cl. 175—182)

This invention relates to an advantageous method and apparatus for determining the nature or characteristics of a geologic formation traversed by a drill hole, and this application is a continuation-in-part of my pending applications Serial Nos. 55,600, and 91,708 (now Patent No. 2,140,798), filed December 21, 1935, and July 21, 1936, respectively.

The principal object of the invention is to provide an advantageous electrical method and apparatus for determining the nature or characteristics of geologic formations traversed by a drill hole at different depths.

Another object of the invention is to provide an electrical method and apparatus for determining the nature of the stratigraphic formation traversed by a cased or uncased drill hole and which may utilize direct or alternating current of either high or low frequency.

A particular object of the invention is to provide a method and apparatus in which an energizing current is passed through the earth formation adjacent a drill hole, in a direction substantially along or parallel to the bedding planes of the strata, and in which measurements are taken in the energizing circuit, indicative of variations in an electrical characteristic of the earth traversed by the current, as the current is caused to pass successively through strata at different depths.

Another object of the invention is to provide a method and apparatus for determining the electrical characteristics of the strata traversed by a drill hole at different depths by utilizing electrical measurements taken between an electrode located at a substantial distance from the drill hole and an electrode located within the hole.

A further object of the invention is to provide a method and apparatus for the purpose described which utilizes the same electrodes for passing current through the strata and for taking electrical measurements of the strata.

Another object of the invention is to provide a method and apparatus for the purpose described which utilizes an electrode positioned within a drill hole and another electrode located at a substantial distance from the drill hole for passing an electric current through the formation adjacent the drill hole and between the electrodes and which utilizes the same electrodes for determining the electrical characteristics and nature of such formation.

Another object is to provide an electrode of special value in cased hole surveys.

Other objects and advantages of the invention will be brought out in the following specific description thereof or will be apparent therefrom.

According to the present invention an electric current is passed through the strata adjacent a drill hole between an electrode located within the drill hole and another electrode located at a substantial distance from the drill hole, and a series of electrical measurements are made to determine the electrical characteristics of the strata.

Certain forms of apparatus which may be advantageously employed in carrying out the method of this invention are illustrated in the accompanying drawing, and referring thereto:

Fig. 1 is a diagrammatic view of a portion of the sub-surface adjacent a drill hole, showing electrodes and associated electrical energizing and measuring apparatus for use with alternating current according to my invention;

Fig. 2 is an alternative circuit arrangement for use with direct current, which may be employed for taking measurements comparable to those obtained by the apparatus shown in Fig. 1;

Fig. 3 is a view corresponding generally to Fig. 1 and showing a further modification of the electrical circuit; and Fig. 4 is a schematic plan view of an auxiliary inductance which may be employed in conjunction with my apparatus.

Referring to Fig. 1 I have shown an electrode $E_1$ positioned within a drill hole I and connected through a suitably insulated conductor 3 to a source of potential 2 which is connected through suitable conductors to one side of an ammeter shunt 4, the other side of the ammeter shunt 4 being connected through a suitable insulated conductor 5 to a distant electrode $E_2$ connected to the earth at a position remote from the bore hole. Thus an electric current may be established through the earth between the electrodes $E_1$ and $E_2$ and in the external circuit provided by the conductors 3 and 5 and the shunt 4, upon energization of the source of potential 2. A buck-out device is preferably provided whereby the voltage produced by the current in the shunt 4 may be cancelled by an opposing buck-out voltage so that a null reading may be obtained on an instrument 6 connected across the shunt 4, for any value of the current through the shunt 4, so that subsequent indications obtained on said instrument may be made a function of the changes in current flowing between the electrodes $E_1$ and $E_2$ as the position of electrode $E_1$ is changed in the drill hole. Such a buck-out voltage may be conveniently supplied, when the source of potential 2 is alternating as shown in Fig. 1, by utilizing a suitable transformer 7 having a primary 8 connected across the source of potential and a secondary 9 connected to the indicating or recording instrument 6 through a suitable circuit arrangement, which may comprise, for example, variable resistor 10, potentiometer 10', condenser 10''', and switch 10'', so that the voltage produced by the secondary 9 may be adjusted to oppose and cancel the voltage produced across the resistor 4. It will be appreciated that other buck-out arrangements may be utilized, as will be apparent to those skilled in the art.

In the event that a source of D. C. potential is utilized for measurements, the conductor 3 may be connected to one side of a source of fixed or variable D. C. potential 2a and the other side may be connected through a shunt resistor 4a to the conductor 5, as shown in Fig. 2. A source of buck-out voltage may thus be obtained from a battery 7a connected across a potentiometer 10a which has one side connected to one side of the shunt resistor 4a and a variable tap connected to the other side of the shunt resistor 4a. An indicating or recording ammeter 6a may then be connected across the shunt 4a and the resistor 10a may be adjusted to obtain a null reading in a manner comparable to that used with the apparatus shown in Fig. 1.

In practicing the method of this invention I preferably employ a source of potential at 2 or 2a which will maintain a constant value after its initial adjustment, in order to simplify the interpretation of the readings by making the current through the earth between the electrodes $E_1$ and $E_2$ approach a straight line function of the conductivity of the earth between those points, the term "conductivity" being considered herein as including either straight conductance (the reciprocal of resistance) in the case of direct current, or admittance (the reciprocal of impedance) in the case of alternating current. It will be appreciated that in the event a source of variable potential is utilized at 2 or 2a, it will be necessary to take into account the value of the potential for any given current value when interpreting the results of the survey, as will be apparent to those skilled in the art.

When starting a survey the hole electrode $E_1$ may be lowered into the drill hole 1 into contact with the drilling fluid or other conducting fluid to the depth at which the survey is to be started. An electric current will then flow between the electrodes $E_1$ and $E_2$ and a reading may be obtained on the instrument 6. I then prefer to adjust the potentiometer 10' so that a null reading is obtained at 6. The instrument 6 may comprise an indicating meter, but I prefer to use a recording meter which will record variations in current between the electrodes $E_1$ and $E_2$ versus the depth to which the electrode $E_1$ is lowered.

When the current flow is between an electrode $E_1$ within the drill hole and another electrode $E_2$ situated at a considerable distance from the mouth of the drill hole, the general path of current flow is substantially perpendicular to the axis of the hole so that such current flow will be substantially parallel to the bedding planes of the strata and will concentrate within the strata having the higher conductivities, adjacent the position of the electrode $E_1$. It will also be evident that the current need travel only a short distance through the fluid in the drill hole so that there is a decided tendency for the current not to travel along the drill hole for any considerable distance to strata of higher conductivity. This relatively small conductive path provided in the drill hole prevents conduction to highly conductive strata located a considerable distance from electrode $E_1$, and thus prevents the masking of the electrical properties of thin strata and the masking of strata which do not show pronounced differences in electrical properties from adjacent strata. Thus the distant electrode $E_2$ is preferably located from the mouth of the drill hole at a distance of not less than one-third the depth, and more preferably equal to or greater than the depth, to which the survey is carried, when taking measurements along or substantially parallel to the bedding planes of the strata, for reasons above and other reasons which have been fully brought out in my above-mentioned pending applications.

As the electrode $E_1$ is lowered into the hole there will naturally be a more or less uniform change in the current flowing between the electrodes $E_1$ and $E_2$ if the portion of the earth therebetween is of a uniform nature, so that if strata having different electrical conductivities are encountered as the electrode $E_1$ is moved to different depths, such strata will manifest themselves as anomalies on the recording meter record. The thickness and electrical characteristics and consequently the nature of the strata may be deduced from the length and magnitude of such anomalous indications.

It will be appreciated that the source of potential 2 may be of variable voltage, but I find it preferable to use a constant potential source such as, for example, power from a commercial alternating current power line or, if a source of direct current potential is utilized as shown at 2a in Fig. 2, a storage battery or a constant voltage D. C. generator.

Referring to Fig. 3, I have shown a type of circuit which may be utilized for taking measurements according to my invention, which is generally applicable to direct or alternating current. However, such a circuit would ordinarily be used with alternating current. The conductor which connects the hole electrode $E_1$ to the measuring circuit is usually wound on a reel so that the inductance of this conductor is relatively high when alternating current is used for measurement and will decrease as the electrode $E_1$ is lowered into the drill hole. For this reason I prefer to utilize a measuring circuit which will discriminate between the reactive and resistive components of the current being measured.

In Fig. 3 I have shown a source of potential 22 connected across a suitable bridge comprising arms 23, 24, 25, and 26, the arms 23 and 24 being resistance arms and the arm 25 comprising a reactance L and a resistance R, the arm 26 comprising the circuit in which measurements are to be taken with the lumped reactance and resistance indicated in dotted lines at 27 and 28. The actual circuit which constitutes the arm 26 comprises an electrode $E_1$ located within a drill hole 21 and connected by a suitably insulated conductor 29 through a reel 30 to one point of the bridge, and a grounded distant electrode $E_2$ connected through an insulated conductor 31 to the point of said bridge which constitutes the other end of said arm. Thus, upon energization of the power source 22 a current flow may be established between the electrodes $E_1$ and $E_2$ and the bridge may be balanced, as indicated by a galvanometer 32, by adjusting the variable resistance and reactance R and L in the arm 25. The galvanometer 32 is preferably of the alternating current type having the movable coil connected across the bridge, and the magnetic field supplied by inphase alternating current.

In order to facilitate this adjustment I preferably provide a two-element oscillograph 33 having an element 34 connected across the arm 25 and an element 35 connected across the arm 26 so that the magnitude and phase-relationship of the voltages present in the arms 25 and 26 may be visually compared. A balanced condition will then exist when the two oscillograms are observed to be of equal magnitude and in phase. It will be appreciated that it is not necessary to employ the galvanometer 32 if the oscillograph 33 is used to determine the balanced condition; however, the galvanometer should read zero at the balanced point and thereby serves as a useful check on the adjustment. For greater sensitivity, the oscillograph may be preceded by suitable differential circuits and amplifying or cathode ray oscillographs with sweep circuits may be employed, connected to the bridge in the position of the meter 32.

The apparatus shown in Fig. 3 may be used according to the method described with relation to Figs. 1 and 2 and the values of L and R required for balance may be logged at various depths as the electrode $E_1$ is raised or lowered in the drill hole 21. The inductance of the conductor 29 will continually decrease as the electrode $E_1$ is lowered into the drill hole, due to the decrease of the inductance of the reel 30 as the turns remaining on the reel are decreased, while the resistance of said conductor will remain substantially constant. It is evident that if the electrical properties of the strata traversed by the drill hole 21 are of a uniform nature, both the resistance and the reactance of the earth between the electrodes $E_1$ and $E_2$ will vary uniformly as the electrode $E_1$ is lowered into the drill hole, and consequently, there will be a uniform variation in the total resistance and total reactance of the bridge arm 26. Thus it may be seen that variations in the electrical properties of the strata traversed by the electrode $E_1$ as it passes along the drill hole 21 will appear as anomalous settings of the variable resistance R and the variable reactance L required to balance the bridge.

Since the inductance supplied to the external or electrode circuit by the conductor 29 is a function of the number of turns of said conductor present on the reel 30, it is evident that an auxiliary variable inductance operatively associated with the reel 30 may be placed at a suitable point in the bridge circuit in such manner as to automatically compensate for such variations. For example, such an auxiliary inductance may be placed in series with the conductor 29 and geared to or otherwise operatively connected to the reel 30 so that the value of the sum of the inductance of the conductor 29 and the auxiliary inductance would at all times be constant irrespective of the position of the electrode $E_1$. If such an arrangement is used, the balancing of the bridge may be greatly simplified, and variations in the setting of reactance L will directly indicate variations in reactance of the earth included between the two electrodes.

Referring to Fig. 4, I have shown such an auxiliary inductance associated with the reel 30. The reel 30 is shown mounted on a shaft 41 which rotates therewith and carries a small sprocket 42 at one end thereof, and a slip ring 43 at the other end thereof which is connected to the inner end of the conductor 29 carried by the reel and extending into the drill hole. A suitable spring brush 44 is in contact with the slip ring 43 and is connected to a winding 47 of an auxiliary inductance indicated at 45. The other end of the winding 47 may be connected to the bridge shown in Fig. 3 so as to connect said winding in series in the conductor 29, between said bridge and the electrode $E_1$. The inductance 45 may comprise a cylindrical iron shell 46 provided with a hollow core 48 which carries the coil 47. A suitable iron plunger 49 extends through an opening in the top of the shell 46 and is provided with threads 51 at the outer end thereof and is adapted to be moved inwardly and outwardly with respect to a tapering central bore of upwardly increasing diameter in the hollow core 48. A large diameter sprocket 52, having a threaded hub 53 which engages the threads 51, is mounted between stationary thrust bearing supports 54 and 55. A chain 56 is used to couple the sprockets 42 and 52 so that the rotary movement of the drum 30 during the winding or unwinding of the cable 29 will be imparted to the sprocket 52. Thus as the cable 29 is unwound, assuming Fig. 4 to be a plan view of Fig. 3, the plunger 49 will move inwardly to increase the inductance of the auxiliary inductance 45, by decreasing the reluctance of the path of magnetic flux generated by the winding 47.

It will be appreciated that threads 51 should be of relatively fine pitch and that ratios of movements of the shaft 41 and the hub 53 should be relatively high so that the plunger 49 will move the required distance for each revolution of the reel 30. It will be noted that the bore of core 48 is shown as provided with a curved inner surface of downwardly increasing slope, so that the movement of the plunger 49 will not produce a straight line variation in inductance, since the inductance per turn of the reel 30 is also a function of the diameter of the winding, carried by the reel. It should also be appreciated that numerous drives may be substituted for the chain and sprocket drive shown and that other forms of inductances may be substituted for the inductance 45 without departing from the spirit of this invention.

I claim:

1. A method for determining the character and thickness of the strata traversed by a drill hole at different depths, which comprises: passing an electrical current through the formation adjacent the drill hole in a direction substantially parallel to the bedding planes of the strata, between two electrodes connected to a measuring circuit; moving one of said electrodes along the drill hole; and measuring the changes in conductivity of the path of said current between said electrodes as said one electrode is moved to different depths.

2. A method for determining the character and thickness of the strata traversed by a drill hole at different depths, which comprises: passing an electrical current through the formation adjacent the drill hole. in a direction substantially parallel to the bedding planes of the strata, between an electrode within the drill hole and another electrode located at a substantial distance from said hole; moving said first-named electrode along the drill hole; and measuring the changes in conductivity of the path of said current between said electrodes as said one electrode is moved to different depths.

3. A method for determining the character and thickness of the strata traversed by a drill hole at different depths, which comprises: passing an electrical current between two electrodes and through the formation adjacent the drill hole in a direction substantially parallel to the bedding planes of the strata; moving one of said electrodes along the drill hole; and measuring the changes in said current as said one electrode is moved to different depths.

4. A method for determining the character and thickness of the strata traversed by a drill hole at different depths, which comprises: passing an electrical current between two electrodes connected to a measuring circuit and through the formation adjacent the drill hole in a direction substantially parallel to the bedding planes of the strata; moving one of said electrodes along the drill hole; and taking measurements of an electrical characteristic in said measuring circuit to determine changes in the conductivity of the path of said current through the earth between said electrodes as said one electrode is moved to different depths.

5. A method for determining the character and thickness of the strata traversed by a drill hole at different depths, which comprises: passing an electrical current through the formation adjacent the drill hole, in a direction substantially parallel to the bedding planes of the strata, between two electrodes connected to a source of constant potential; moving one of said electrodes along the drill hole; and measuring the changes in said current as said one electrode is moved to different depths.

6. A method for determining the character and thickness of the strata traversed by a drill hole at different depths, which comprises: passing an electrical current through the formation adjacent the drill hole, in a direction substantially parallel to the bedding planes of the strata, between an electrode within the drill hole and another electrode located at a substantial distance from the drill hole while energizing said electrodes from a constant potential source; moving said first-named electrode along the drill hole; and measuring the changes in said current as said one electrode is moved to different depths.

7. A method for determining the character and thickness of the strata traversed by a drill hole at different depths, which comprises: passing an electrical current through the formation adjacent a drill hole in a direction substantially along and parallel to the bedding planes of the strata, between two electrodes connected to a measuring circuit and a source of electrical current; moving one of said electrodes to different depths within the drill hole; and measuring changes in an electrical variable in said circuit indicative of an electrical property of the strata adjacent said drill hole, as said one electrode is moved to different depths.

8. A method for determining the character and thickness of the strata traversed by a drill hole at different depths, which comprises: passing an electrical current through the formation adjacent a drill hole in a direction substantially along and parallel to the bedding planes of the strata between an electrode within said drill hole and connected to a measuring circuit, and another electrode connected to said circuit and to the earth at a distance from said drill hole greater than one-third the depth of the first-named electrode within the drill hole; moving said first-named electrode to different depths within the drill hole; and measuring changes in an electrical variable in said circuit, as said first-named electrode is moved to different depths, indicative of an electrical property of the strata adjacent said drill hole.

9. An apparatus for determining the character and thickness of the strata traversed by a drill hole at different depths, which comprises: an electrode; means insulated from said drill hole for lowering said electrode to different depths in the drill hole and into electrical connection with the fluid contained in the drill hole; a second electrode connected to the earth at a point removed from said drill hole by a distance of at least one-third the depth of said first-named electrode within the drill hole; a bridge circuit having one arm comprising a variable resistance and a variable reactance, and another arm connected to said two electrodes; a source of alternating current connected to said bridge circuit; and means in said bridge circuit for indicating variations in an electrical property of the earth included between said electrodes.

10. In an apparatus for use in determining the character and thickness of the strata in a geologic formation traversed by a drill hole, the combination which comprises: a reel; an insulated conductor wound on said reel and constituting a self-inductance which changes with the amount of said conductor carried by said reel; an auxiliary inductance operatively associated with said reel and operative to change its inductance in opposition to the changes in self-inductance of the conductor carried on said reel; two electrodes; and means electrically connecting said conductor and said auxiliary inductance in series between said electrodes.

11. A method for determining the character and thickness of the strata traversed by a drill hole at different depths, which comprises: passing an electrical current through the formation adjacent the drill hole, in a direction substantially parallel to the bedding planes of the strata, between two electrodes connected to a measuring circuit; moving one of said electrodes to different depths along the drill hole; and observing the changes in the resistance and reactance of the formation included between said electrodes, as said one electrode is moved to different depths.

12. An apparatus for determining the character and thickness of the strata traversed by a drill hole at different depths, which comprises: an electrode within a drill hole and in electrical contact with the fluid in said drill hole; means insulated from said drill hole for moving said electrode to different depths within the drill hole; a second electrode connected to the earth at a point removed from the drill hole; and means including a source of electric current for producing an electric current flow through the earth between said electrodes, connected to said electrodes for measuring the changes in conductivity of the portions of the earth included between said two electrodes as said first-named electrode is moved to different depths, said second electrode being sufficiently removed from the drill hole to cause said current to flow substantially along and parallel to the bedding planes of the strata adjacent the drill hole.

13. The apparatus set forth in claim 12, said second electrode being connected to the earth at a point removed from said drill hole a distance at least one-third the depth of the first-named electrode within the drill hole.

14. An apparatus for determining the character and thickness of the strata traversed by a drill hole at different depths, which comprises: an electrode positioned in the drill hole and in electrical contact with the fluid in said hole; a second electrode connected to the earth at a point removed from the drill hole at a distance at least one-third of the depth of the first-named electrode within the drill hole; conductor means connecting each of said electrodes to a source of constant potential; means for moving said first-named electrode to different depths in the drill hole; and means for measuring changes in electrical current in said conductor means.

JOHN JAY JAKOSKY.